United States Patent [19]

Rapp

[11] 4,418,465

[45] Dec. 6, 1983

[54] WIRE CUTTING AND INSULATION SOFTENING APPARATUS

[75] Inventor: Willard E. Rapp, Griggstown, N.J.

[73] Assignee: Western Electric Co., New York, N.Y.

[21] Appl. No.: 469,664

[22] Filed: Feb. 25, 1983

Related U.S. Application Data

[62] Division of Ser. No. 307,454, Oct. 1, 1981, Pat. No. 4,382,456.

[51] Int. Cl.[3] .............................................. B23P 23/00

[52] U.S. Cl. .................................. 29/566.1; 29/566.4; 29/33 F

[58] Field of Search .................... 140/1, 122, 123, 124; 72/211; 30/90.3; 81/9.5 R; 7/107, 158; 29/57, 33 F, 566.4, 566.1; 100/171, 176, 403.1; 242/7.17

[56] References Cited

U.S. PATENT DOCUMENTS

| | | | |
|---|---|---|---|
| 2,544,784 | 3/1951 | Frum | 7/158 |
| 2,743,502 | 5/1956 | Reck | 29/33 F |
| 3,198,038 | 8/1965 | Fleming | 81/9.5 R |
| 3,747,648 | 7/1973 | Bauer | 140/147 |
| 3,780,928 | 12/1973 | Shirn | 228/13 |
| 3,781,932 | 1/1974 | Baker et al. | 7/14.1 |
| 4,169,310 | 10/1979 | Murphy | 29/751 |

*Primary Examiner*—Francis S. Husar
*Assistant Examiner*—Linda McLaughlin
*Attorney, Agent, or Firm*—A. M. Tobia; D. J. Kirk

[57] ABSTRACT

An apparatus (50) for cutting a wire (21) and softening the insulation thereof. The apparatus (50) is comprised of a pair of wire cutters (52) with a pair of opposed rollers (74, 76) associated therewith. The rollers (74, 76) are mounted for relative movement away from one another to enable an insulated wire to be passed therebetween and into the wire cutters (52). The rollers (74, 76) are also relatively movable toward each other for engaging and softening the wire (21) insulation upon actuation of the wire cutters (52) to cut the wire.

5 Claims, 4 Drawing Figures

WIRE CUTTING AND INSULATION SOFTENING APPARATUS

This is a division of application Ser. No. 307,454 filed Oct. 1, 1981 patented May 10, 1983 U.S. Pat. No. 4,382,456.

TECHNICAL FIELD

This invention relates to an apparatus for cutting and softening the insulation of insulated wire.

BACKGROUND OF THE INVENTION

Solderless wire wrapping is a reliable method for making point to point mechanical and electrical connections between wires and terminals. Wire wrapping techniques may be used in many applications where low-cost, high-density wiring is important and is particularly useful where it is desirable to easily modify a circuit, since wrapped panels can be readily taken apart. Typical applications are found in computer central processors and peripheral equipment, radar units, test equipment, telephone PBX and central office equipment.

Automatic tools for cutting, stripping and wrapping insulated wire as described in U.S. Pat. Nos. 4,169,310 and 3,781,932, and incorporated by reference herein, have been used in the past to wrap wires around terminals. These tools allow wrapping of wire of different sizes in a manner in which the wire need not be pre-cut or pre-stripped before the wrapping operation. Such wire wrapping tools include a hand held drive motor coupled to a wire wrapping bit. For example, U.S. Pat. Nos. 4,169,310 and 3,781,932, disclose a bit and a sleeve for receiving the bit. In operation of the tools, the insulated wire is inserted into a groove, cut to length, stripped, and the proper length of wire is wrapped on the terminal a desired number of turns by the tool. The stripped insulation remains in the groove and is later forced out of the groove by insertion of the next wire to be wrapped.

Unfortunately the use of such tools is not suitable for all types of insulated wire. It has been found that in certain wire, such as 26 gauge pvc insulated wire, it is not uncommon to encounter wire breakage when attempting to wrap the wire around the terminal pin.

SUMMARY OF THE INVENTION

The present invention is based upon the discovery that wire breakage during wrapping is associated with the brittleness or hardness of the insulation around the wire and that this problem may be overcome by softening the wire before inserting it into the wrapping bit of the wire wrapping tool. Accordingly, an apparatus based upon this discovery is comprised of a pair of wire cutters having means attached thereto for softening the insulation of the wire.

DETAILED DESCRIPTION

Figure 1:
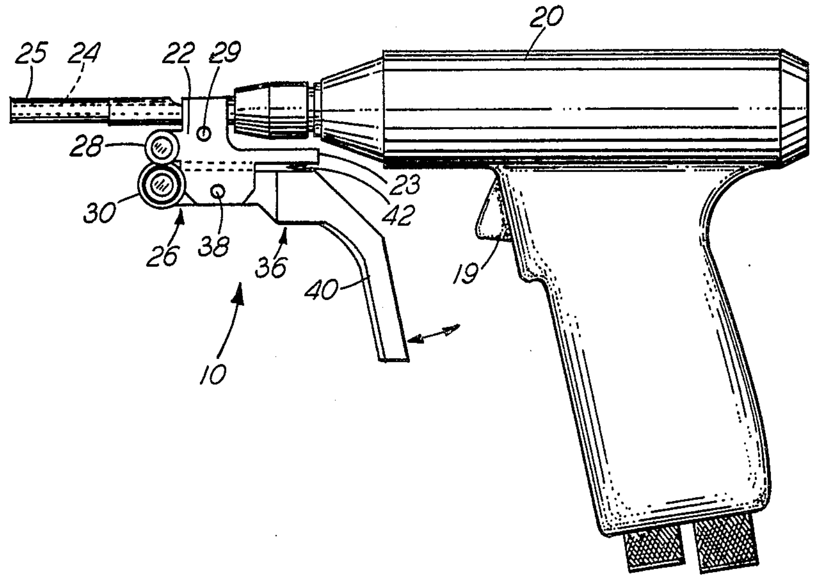
FIG. 1 is a side elevational view of a power operated wire wrapping tool, which constitutes one embodiment of the invention.
Figure 2:
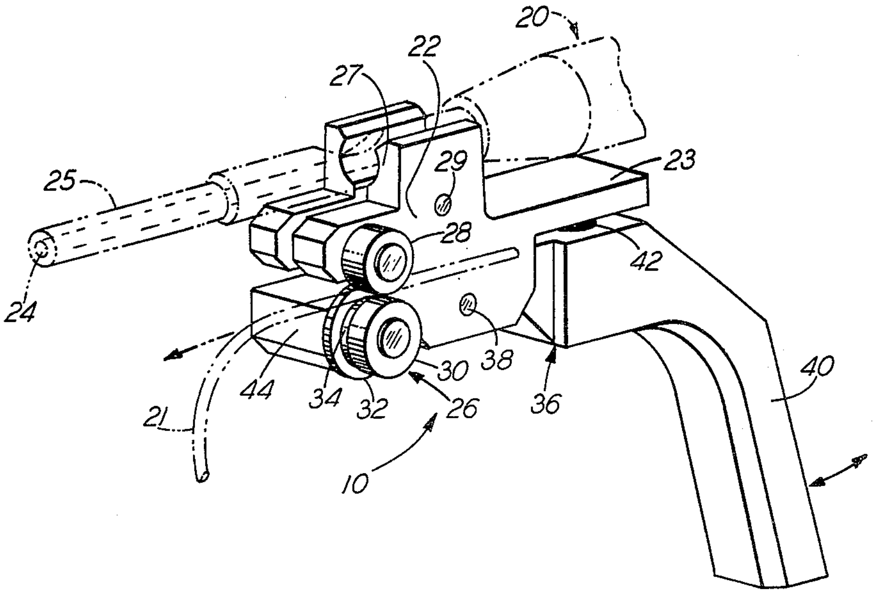
FIG. 2 is a perspective view of the frame and wire softening device of FIG. 1, the bit and sleeve being shown in phantom.

Referring now to FIG. 1, there is shown an automatic wire wrapping tool 10 which includes a powered air gun 20 having a trigger 19, a wire wrapping bit 24, a sleeve 25 and a device 26 for softening the insulation of the wire 21 (FIG. 2). The air gun 20 is conventional and any suitable commercial gun, such as a Standard Pneumatic Model No. 615, may be employed. The combination of bit and sleeve, which is conventional and more fully described in the aforementioned U.S. Pat. No. 4,169,310 functions to cut, strip and wrap the wire around a terminal (not shown).

As more clearly seen in FIG. 2, the wire softening device 26 includes a frame 22 having a cradle 27 for receiving the sleeve 25 and a set screw 29 for securing the cradle to the sleeve. The device 26 further includes a movable arm 36 having a trigger end 40 and a forward end 44. The arm 36 is pivotally connected to the frame 22 by a pivot pin 38. The trigger end 40 is biased against an extended portion 23 of the frame 22 by a spring 42, and, as best seen in FIG. 1, is in line with the trigger 19 of the gun 20 to facilitate movement of the operator's finger from the trigger 19 of the gun 20 to the trigger end 40 of the arm 36 of the softening device 26. Affixed to the frame 22 is an upper roller 28 and affixed to the forward end 44 of the movable arm 36 is a lower roller 30. Advantageously, the rollers 28 and 30 are ball bearings. The bias of the spring 42 against the trigger end 40 of the arm 36 urges the lower roller 30 toward the upper roller 28 and in engagement therewith. The lower roller 30 has a flange 32 and a groove 34 for guiding a wire 21 pulled between the opposed bearings.

In operation, the gun 20 and the trigger end 40 of the movable arm 36 of the wire softening device 26 are gripped in one hand and the trigger end 40 pulled upward. This compresses the spring 42 and pivots the lower roller 30 away from the upper roller 28. An insulated wire 21 to be softened is then placed between the spaced apart rollers 28,30. The trigger end 40 of the arm 36 is then released, causing the spring 42 to relax, thereby pivoting the lower bearing 30 toward engagement with the upper roller 28 to firmly grip the wire 21 between the rollers 28,30. The wire is then pulled through the opposed rollers 28,30, in the direction shown in FIG. 2, the pressure on the wire 21 being sufficient to soften the insulation so that the wire 21 does not later break upon being stripped and wrapped around a terminal.

Figure 3:
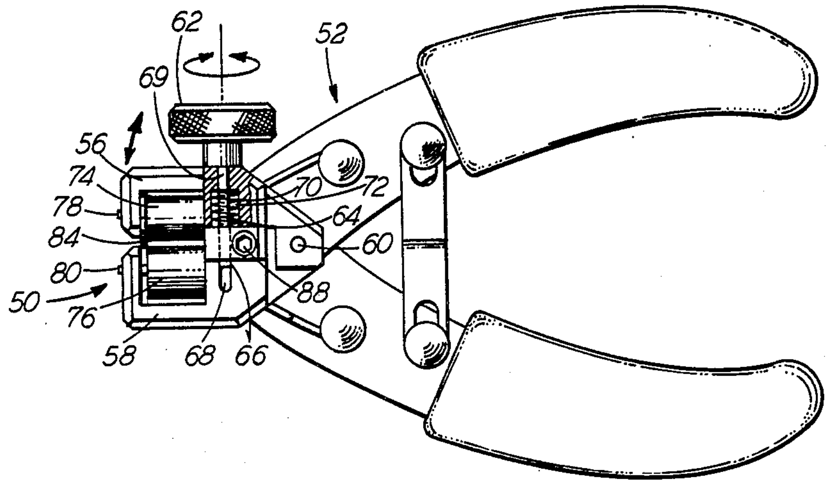
FIG. 3 is a front elevational view of another embodiment of the invention.
Figure 4:
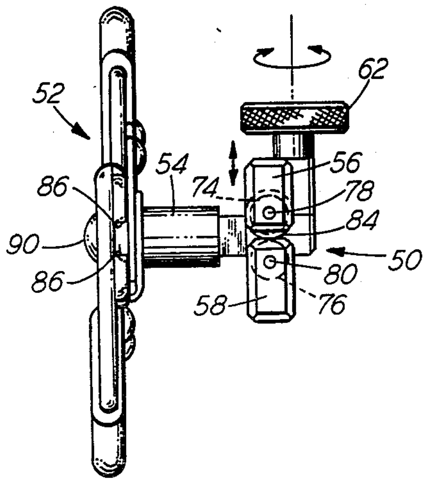
FIG. 4 is an end view of the embodiment shown in FIG. 3.

Referring now to FIGS. 3 and 4, an alternative embodiment of the invention is shown. The wire softening device 50 in this alternative embodiment can soften a bundle of 10-to-12 wires in a single operation. The device 50 includes two C-type brackets 56,58 fastened together by a pivot pin 60. The first bracket 56 may be pivoted toward and away from the second bracket 58 by means of a thumb screw 62. The screw 62 has a threaded shaft 64, the front end 66 of which is received within a threaded bore 68 formed within the bracket 58. The shank 69 of the shaft 64 has a coil spring 70 disposed thereabout and is received within a channel 72 formed in the bracket 56.

Each bracket 56,58 supports a rolleer 74,76, such that the rollers are parallel with one another and are normally spaced apart but are movable towards each other upon pivoting of the first bracket 56. The rollers 74,76 are rotatably mounted on respective shafts 78,80 which, in turn, are fixedly supported in the brackets 56,58, respectively. Advantageously, each roller 74,76 includes a plurality of internal ball bearings (not shown) encircling its respective support shaft 78,80. A flange 84 is positioned on the top of one of the rollers, e.g., the first roller 74, to prevent the wires to be rolled from sliding off the ends of the rollers 74,76.

Preferably, the softening device 50 is combined with a conventional wire cutter 52 having a pair of cutting edges 86,86 pivotally interconnected by a pivot pin 90. The device 50 is attached to the cutter 52 by a shaft 54, affixed at one end to the second bracket 58 of the softening device by a screw 88 and affixed to the wire cutter by the pivot pin 90. The length of the shaft 54 is determined by the length of wire to be softened.

Advantageously, the combined cutter and softener of FIGS. 3 and 4 is employed to cut and soften a plurality of wires in essentially one operation in the following manner. With the rollers 74,76 and the cutting edges 86,86 in their spaced apart positions, a bundle of wires is placed between the rollers and the cutting edges 86,86. The thumb screw 62 is then tightened, thereby pivoting the first bracket 56 and its respective roller 74 towards the second bracket 58 and roller 76. The coil spring 70 is also consequently compressed. The wires are then cut to even length by pivoting the cutting edges 86,86 of the wire cutter 52. While the bundle of wires is held firmly in one hand the device 50 is then rolled over the wires to soften the insulation.

To repeat the operation, the thumb screw 62 is loosened, releasing the spring 70 to return the first bracket 56 and its respective roller 74 to the spaced apart position.

It is to be understood that the above-described tools and methods are merely exemplary embodiments of the invention. Numerous other modifications may be readily devised by those skilled in the art which will embody the principles of the invention and fall within the spirit and scope thereof.

What is claimed is:

1. Apparatus for cutting and softening insulated wire comprising:

a pair of wire cutters;

means attached to the pair of wire cutters for softening the insulation of the wire comprising:

(a) a pair of opposed rollers; and (b) means for mounting the rollers such that they are relatively movable away from one another to enable an insulated wire to be wrapped to be passed therebetween, and relatively movable towards each other for engaging and softening the wire insulation.

2. Apparatus as recited in claim 1, wherein at least one roller has a flange for preventing the wires to be softened from sliding off the rollers.

3. Apparatus as recited in claim 1, wherein the means for mounting the rollers include a pair of C-brackets pivotally interconnected so as to be movable toward and away from each other, the rollers being, respectively, mounted within the brackets such that they oppose one another.

4. Apparatus as recited in claim 3, further comprising a thumb screw for moving the brackets, each of the brackets having a bore for receiving the thumb screw, at least one of the bores being threaded.

5. Apparatus as recited in claim 1, wherein the means for softening the insulation of the wire is attached to the pair of wire cutters by a rod, the length of the rod being determined by the length of the wire to be softened.

* * * * *